(12) United States Patent
Molnar (10) Patent No.: US 9,314,134 B2
(45) Date of Patent: Apr. 19, 2016

(54) ELECTRICAL PORTABLE BROILER

(71) Applicant: SCI Direct, LLC, North Canton, OH (US)

(72) Inventor: Jon P. Molnar, Massillon, OH (US)

( * ) Notice: Subject to any disclaimer, the term of this patent is extended or adjusted under 35 U.S.C. 154(b) by 0 days.

(21) Appl. No.: 14/628,908

(22) Filed: Feb. 23, 2015

(65) Prior Publication Data

US 2015/0164275 A1 Jun. 18, 2015

Related U.S. Application Data

(63) Continuation-in-part of application No. 13/887,591, filed on May 6, 2013, now Pat. No. 8,993,026.

(51) Int. Cl.
| | |
|---|---|
| *A47J 37/06* | (2006.01) |
| *A23L 1/01* | (2006.01) |
| *A23L 3/005* | (2006.01) |
| *A21B 1/22* | (2006.01) |
| *A47J 37/07* | (2006.01) |
| *A21B 1/52* | (2006.01) |
| *A47J 37/08* | (2006.01) |

(52) U.S. Cl.
CPC ............... *A47J 37/0676* (2013.01); *A21B 1/22* (2013.01); *A21B 1/52* (2013.01); *A23L 1/0128* (2013.01); *A23L 3/0055* (2013.01); *A47J 37/0635* (2013.01); *A47J 37/0652* (2013.01); *A47J 37/0682* (2013.01); *A47J 37/0759* (2013.01); *A47J 37/0807* (2013.01); *A47J 2037/0795* (2013.01)

(58) Field of Classification Search
CPC ...................... A47J 2037/0617; A47J 37/0676; A47J 37/0709; A47J 37/0759; A47J 37/0763; A47J 37/0807; A47J 37/0682; A47J 37/0652; A47J 2037/0795; A47J 37/0635; A21B 1/06; A21B 1/22; A21B 1/52; A23L 1/0128; A23L 1/0257; A23L 3/0055
USPC .................... 426/523, 241–243; 99/339, 340, 99/349–351, 375, 376, 379, 389–392, 400, 99/401, 422, 425, 444–448, 450, 451
See application file for complete search history.

(56) References Cited

U.S. PATENT DOCUMENTS

| | | | | |
|---|---|---|---|---|
| 1,903,477 A | * | 4/1933 | Rolfson | F24C 7/04 126/39 BA |
| 2,980,101 A | * | 4/1961 | Anetsberger | A47J 37/0682 126/299 R |
| 3,103,160 A | * | 9/1963 | Forniti | A47J 37/074 126/38 |
| 3,366,035 A | * | 1/1968 | Jones | A47J 37/0688 99/334 |
| 3,947,657 A | * | 3/1976 | Ershler | F24C 7/10 126/9 R |
| 4,144,870 A | * | 3/1979 | Reynolds | A47J 37/06 126/41 E |
| 4,178,500 A | * | 12/1979 | Brindopke | A47J 37/0611 219/386 |
| 4,455,319 A | * | 6/1984 | Clark | H05B 3/30 126/19 R |
| 4,969,449 A | * | 11/1990 | Levin | A47J 37/0786 126/221 |
| 6,012,444 A | * | 1/2000 | Skender | F24C 3/087 126/21 A |
| 8,993,026 B2 | * | 3/2015 | Molnar | A47J 37/0682 426/523 |
| 2003/0200961 A1 | * | 10/2003 | Tiernan | A47J 37/041 126/30 |
| 2004/0173199 A1 | * | 9/2004 | Cantal | A47J 37/0647 126/41 R |

(Continued)

*Primary Examiner* — Drew Becker
(74) *Attorney, Agent, or Firm* — Buckingham, Doolittle & Burroughs, LLC (57) ABSTRACT

The present invention relates to an electrical infrared-style broiler sized to be portable, safe, and occupy minimal space, while still providing an additional cooking surface area for use as an electric griddle. The electric griddle is heated from below by way of an electrical heating tube and the grilling surface is heating from above via an infrared heating plate.

9 Claims, 9 Drawing Sheets

(56) References Cited

U.S. PATENT DOCUMENTS

| | | | | |
|---|---|---|---|---|
| 2008/0099471 A1* | 5/2008 | Fadelli | A47J 37/0611 | 219/685 |
| 2008/0257171 A1* | 10/2008 | Wang | A47J 37/0807 | 99/389 |
| 2012/0033953 A1* | 2/2012 | Lee | A47J 37/0629 | 392/418 |
| 2013/0161315 A1* | 6/2013 | Cowan | F24C 7/043 | 219/411 |
| 2013/0202754 A1* | 8/2013 | Cochran | A47J 36/02 | 426/383 |
| 2013/0256906 A1* | 10/2013 | Mori | H01L 23/5384 | 257/774 |
| 2015/0230295 A1* | 8/2015 | Morassut | H05B 6/76 | 219/685 |

* cited by examiner

ELECTRICAL PORTABLE BROILER

CROSS-REFERENCE

This application is a continuation-in-part of Utility patent application Ser. No. 13/887,591 filed May 6, 2013, now U.S. Pat. No. 8,993,026.

BACKGROUND

The present invention relates to an electrical portable broiler. More particularly, the present invention relates to a portable device for cooking food items from above to allow the food to drip away from the heating element. Specifically, the present invention relates to an electrical-style broiler sized to be portable, safe, and occupy minimal space, while still providing an additional cooking surface area for use as an electric griddle.

Currently, there are broilers or ovens for which to heat food items, as well as portable grills for use in camping or tailgating activities. These portable food-heating devices are of a grill-type structure where the heating element is underneath the items to be cooked. Some of these are supplied by electrical means and some by natural gas. However, inasmuch as the heating element is placed below the item to be cooked, the food tends to drip down onto the flame or heating element which generates an immediate scorching flame which jumps up towards the food for a fraction of a second. This is not only a dangerous situation from a safety standpoint, but the food itself tends to be seared or burned unevenly resulting in uneven blackened portions of the food.

Additionally, the existing portable grills use a direct flame to heat the food and are either permanently open to the elements, or have a lid which releases a majority of the heat when opened. This provides a huge variance in the temperature output and overall cooking experience. Furthermore, the existing portable grills provide an overall heating footprint which is entirely occupied by the gridiron or grilling surface. Existing grills also occupy an entire table or truck tail gate, with no room for other foods or tailgating items. Thus, if a user wishes to cook additional food, the user must wait until the food on the grilling surface is done first before this additional food can be cooked.

Thus, a need exists in the art to provide a portable style food preparation and heating unit which prevents or neutralizes the problem of the food dripping onto the heating element. The need also exists for cooking food via an alternative to a direct flame. Further, the need also exists to provide an additional cooking surface area for use as an electric griddle without occupying the primary grilling area.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a portable electrical broiler comprising: a housing, a cooking chamber defined by the housing, a grilling surface disposed in the cooking chamber, and an infrared heating plate disposed above the grilling surface, whereby the infrared heating plate heats the grilling surface when powered on. In another aspect, the invention may provide a portable electrical broiler comprising: a housing, an electric griddle disposed on the housing, a stainless steel heating tube disposed in the housing below the electric griddle and operable to heat the electric griddle. A grilling surface is then removably disposed in the housing, an infrared heating plate is disposed in the housing above the grilling surface, and is operable to heat the grilling surface. In another aspect, the invention may provide a method for cooking an item of food on a grilling surface, the method comprising the steps of: positioning a stainless steel heating tube above the grilling surface, positioning an electric griddle above the stainless steel heating tube, positioning an infrared heating plate above the grilling surface but below the stainless steel heating tube, directing an amount of heat downwardly from the infrared heating plate towards the grilling surface, and heating the electric griddle from below via the stainless steel heating tube.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Figure 1:
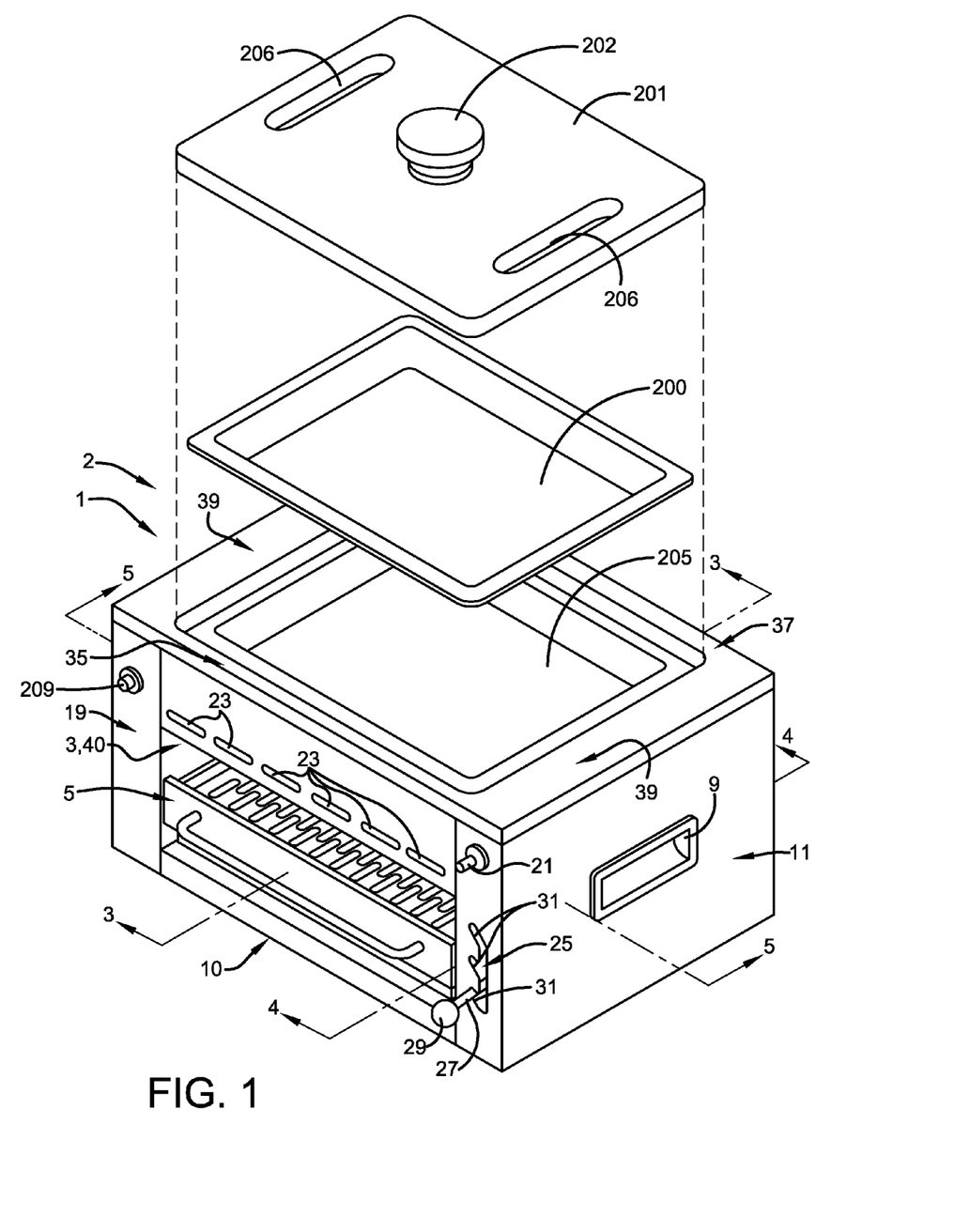
FIG. 1 illustrates a perspective view of an embodiment of the electrical infrared portable broiler of the present invention in accordance with the disclosed architecture.
Figure 2:
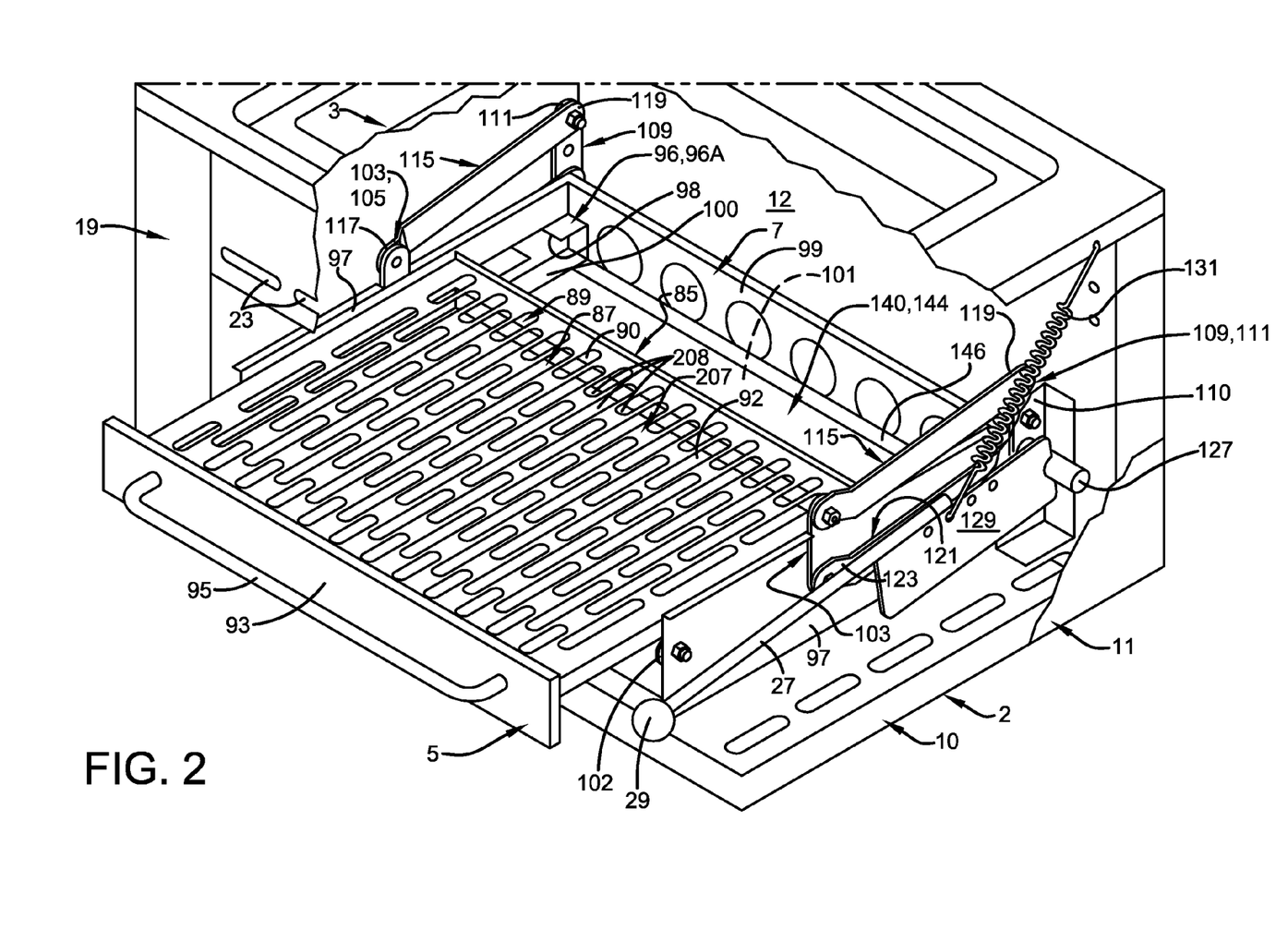
FIG. 2 is a view similar to FIG. 1 with portions cut away to view the internal cooking chamber of an embodiment of the present invention.

The electrical infrared portable broiler of the present invention is shown in FIGS. 1-9 and is indicated generally at 1. As shown in FIGS. 1 and 2, infrared portable broiler 1 includes a main body or housing 2 which is generally box shaped and defines a cooking chamber 3 therein. Cooking chamber 3 is sized to receive a drawer assembly 5 which is slidably engaged with a drawer receiving assembly 7 (FIG. 2). Cooking chamber 3 is generally defined by a bottom wall 10, a back wall 12, and a pair of sidewalls 11. When viewed from the exterior, electrical infrared portable broiler 1 includes a pair of handles 9 extending into corresponding sidewalls 11.

As shown in FIG. 1, infrared portable broiler 1 includes a front wall 19. Front wall 19 as shown in FIG. 1 is made up of several end plates from subcomponents all abutting one another to form the overall general front wall 19. Front wall 19 defines an opening 40 to cooking chamber 3. Extending through and outwardly away from front wall 19 is a push button 21 and a series of vents 23. An adjustment track 25 is also defined by front wall 19 and provides an opening for an adjustment rod 27 to extend therethrough. Adjustment rod 27 terminates in a knob 29 to be used as a handle for actuating rod 27. Track 25 includes at least one cam channel 31, shown in FIG. 3 as three cam channels 31 arranged in a vertically extending series.

Figure 3:
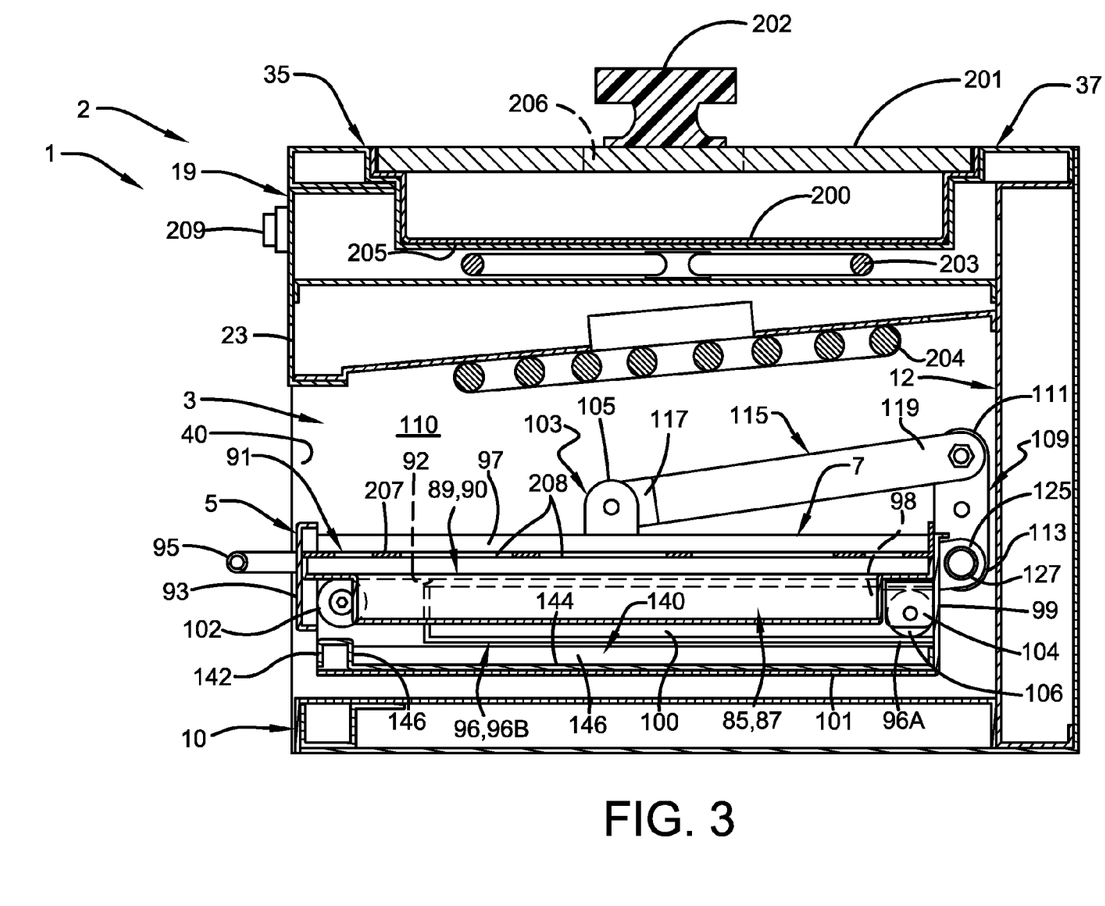
FIG. 3 is a side cross-sectional view taken on line 3-3 of FIG. 1.

As shown in FIGS. 1 and 3, an electric griddle 205 is disposed directly above cooking chamber 3 and includes a general front area 35, opposite back area 37, and two spaced apart side areas 39. Furthermore, a removable baking pan 200 sits on the electric griddle 205 and a lid 201 with a handle 202 covers the baking pan 200. The lid 201 can further include vents 206 positioned on either side of the handle 202 to be used while cooking on the electric griddle 205.

Figure 4:
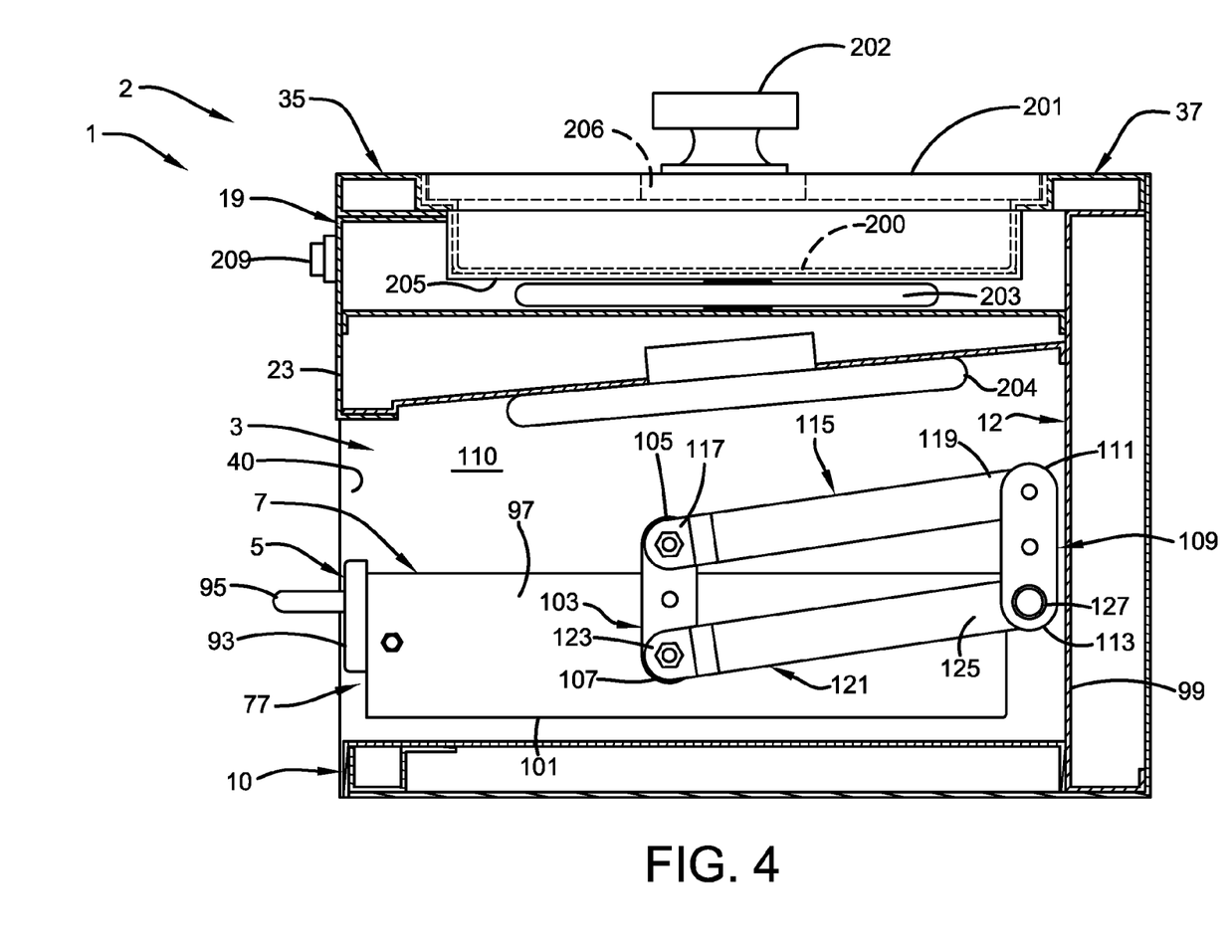
FIG. 4 is a side cross-sectional view taken on line 4-4 of FIG. 1.
Figure 6:
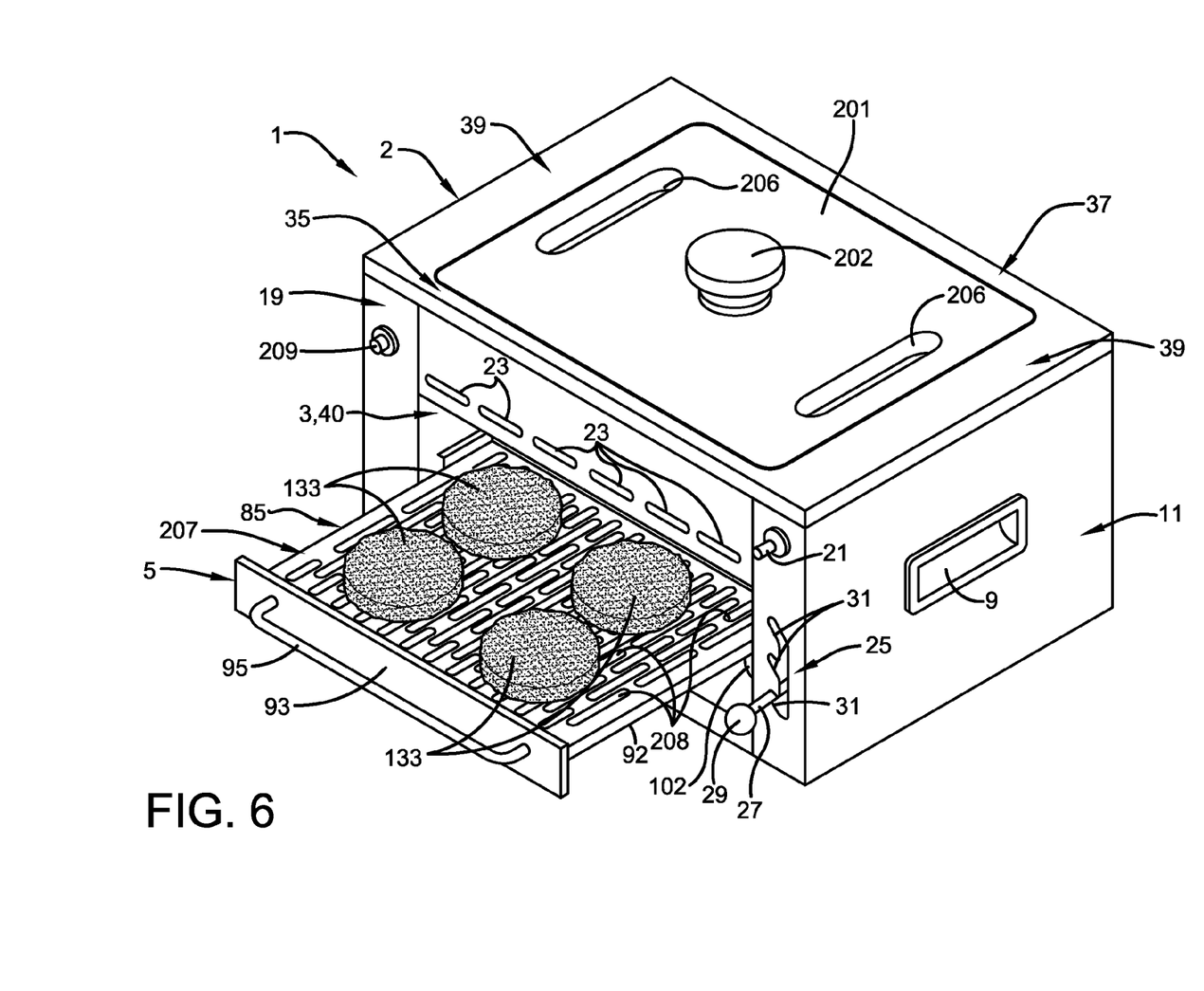
FIG. 6 is a perspective view similar to FIG. 1 showing the drawer assembly extended outwardly away from the cooking chamber.
Figure 7:
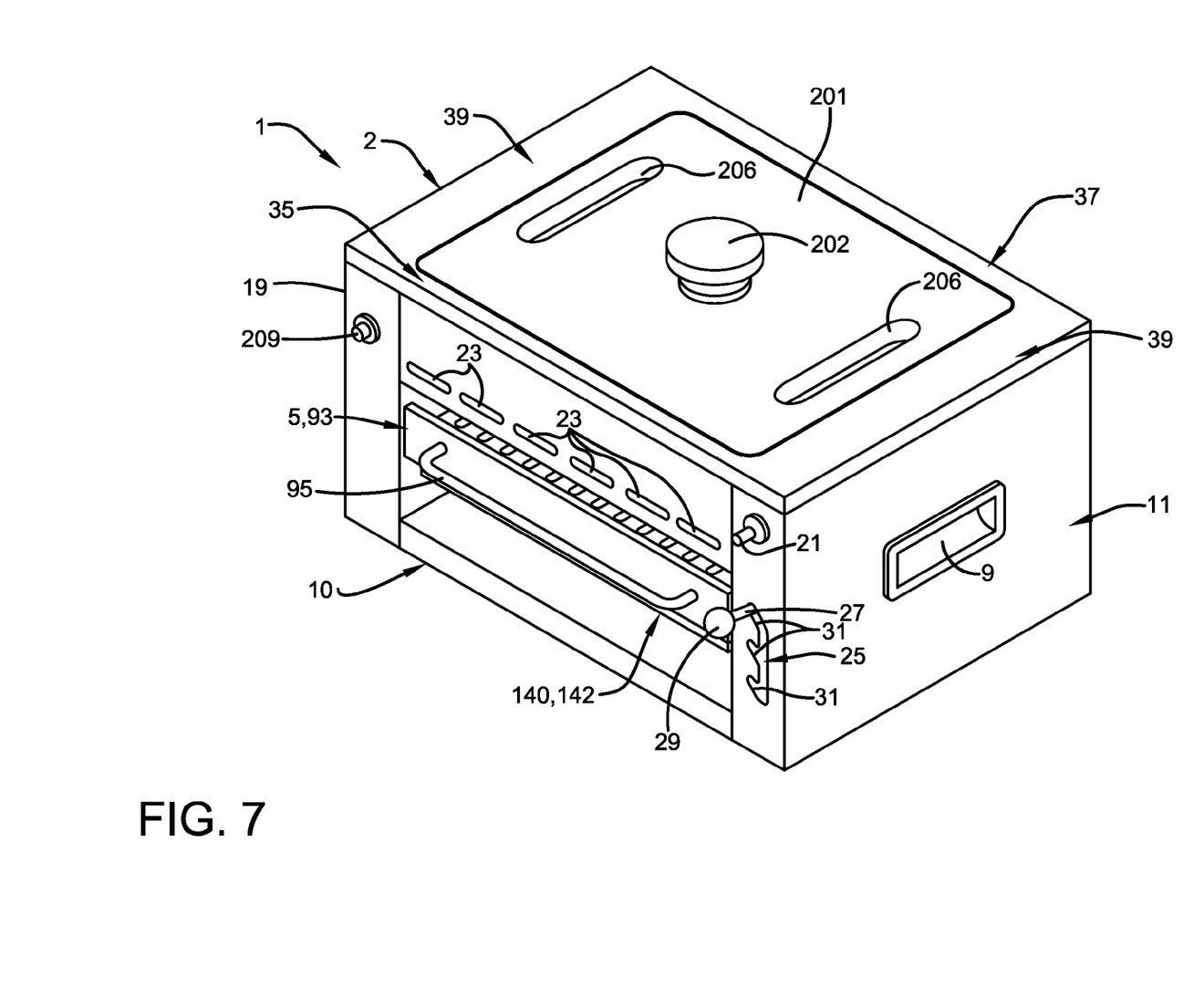
FIG. 7 is a view similar to FIG. 6 showing the drawer assembly retracted into the cooking chamber.

As shown in FIGS. 3, 4, and 6, electrical infrared broiler 1 includes an electrical heating tube 203, such as a stainless steel heating tube disposed above cooking chamber 3, and an electrical power input, for example a power cord connectable with an outlet, and a push button 209 extending through and outwardly away from front wall 19 which acts to power on and off the stainless steel heating tube 203. Rather than ceramic tiles, the electric current is transferred through the resistance coil (i.e., stainless steel heating tube 203) which heats to a desired temperature and emits heat. Heat from the resistance coil warms electric griddle 205 as described below. Further, below the stainless steel heating tube 203 there is positioned an infrared heating plate 204. The infrared heating plate 204 is a ceramic heating plate which contains electric coils embedded within it to heat the infrared heating plate 204 which in turn heats the grate 207 within the drawer assembly 5. Infrared heating plate 204 is powered on and off via push button 21 as shown in FIG. 1. Once powered on, electric current is transferred through the resistance coils within the heating plate which heats the infrared heating plate 204 to a desired temperature and emits heat.

Figure 5:
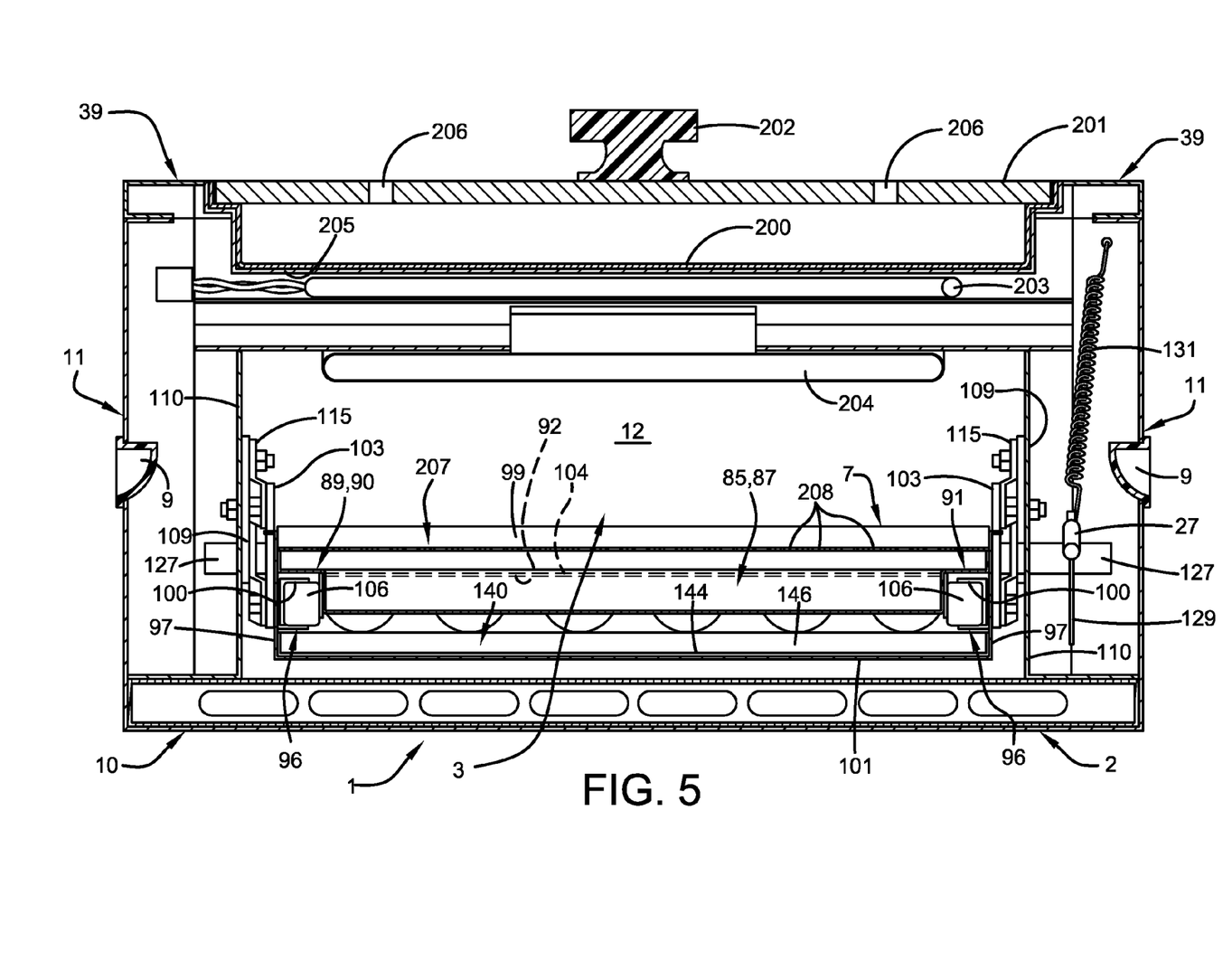
FIG. 5 is a front cross-sectional view taken on line 5-5 of FIG. 1.

As shown in FIGS. 2, 3, and 5, drawer assembly 5 includes a base plate 85 which is generally monolithic and folded or stamped into the desired shape. Base plate 85 includes a stepped region which defines a drip pan 87 and a ledge 89. Ledge 89 is formed to receive a removable grate 207 thereupon. More particularly, ledge 89 includes a top surface 90 and a bottom surface 92, whereby the grate 207 rests upon top surface 90. A front plate 93 extends from base plate 85 and is formed in a generally elongated rectangular shape with a handle 95 extending outwardly away therefrom. The grate 207 is disposed with a plurality of punch-through holes 208 on it. The plurality of holes 208 are sized to retain the food on the grate 207 without allowing the food to slip through the holes 208, but which allow grease to drip through the holes 208 into the drip pan 87.

As shown in FIGS. 2-5, drawer assembly 5 is slidably and removably received within drawer receiving assembly 7. Drawer receiving assembly 7 includes two spaced apart side plates 97 connected by way of a back plate 99 and a bottom plate 101. Similar to a kitchen cabinet drawer, the drawer element of broiler 1 includes a set of rollers secured to the drawer receiver and a set of rollers secured to the drawer itself. Specifically, drawer assembly 5 includes a set of rollers 102 and drawer receiving assembly 7 includes a set of rollers 106.

As shown in FIGS. 3 and 5, rollers 102 are rotatably secured to side plates 97 of drawer receiving assembly 7 while rollers 103 are rotatably secured to drawer assembly 5 by way of bracket 104. Rollers 102 and 103 provide a rolling surface for easily moving drawer assembly 5 in and out of cooking chamber 3 in a kitchen cabinet drawer style of movement. Rollers 102 rollably abut bottom surface 92 of ledge 89 (FIG. 3), while rollers 103 are rollably disposed in a channel 96 which defines a roller void 100. Roller void 100 receives rollers 103 therein and allows rollers 103 to move therein from a back area 96A of channel 96 to a front area 96A of channel 96. When a user wishes to remove drawer assembly 5 completely from housing 2, the user manually lifts drawer assembly 5 such that rollers 103 slide out of channel 96 by way of a notch 98 defined therein (FIG. 2). Thus, drawer assembly 5 becomes free of channel 96 and thereafter may be removed from housing 2 for cleaning, repair, etc.

Figure 9:
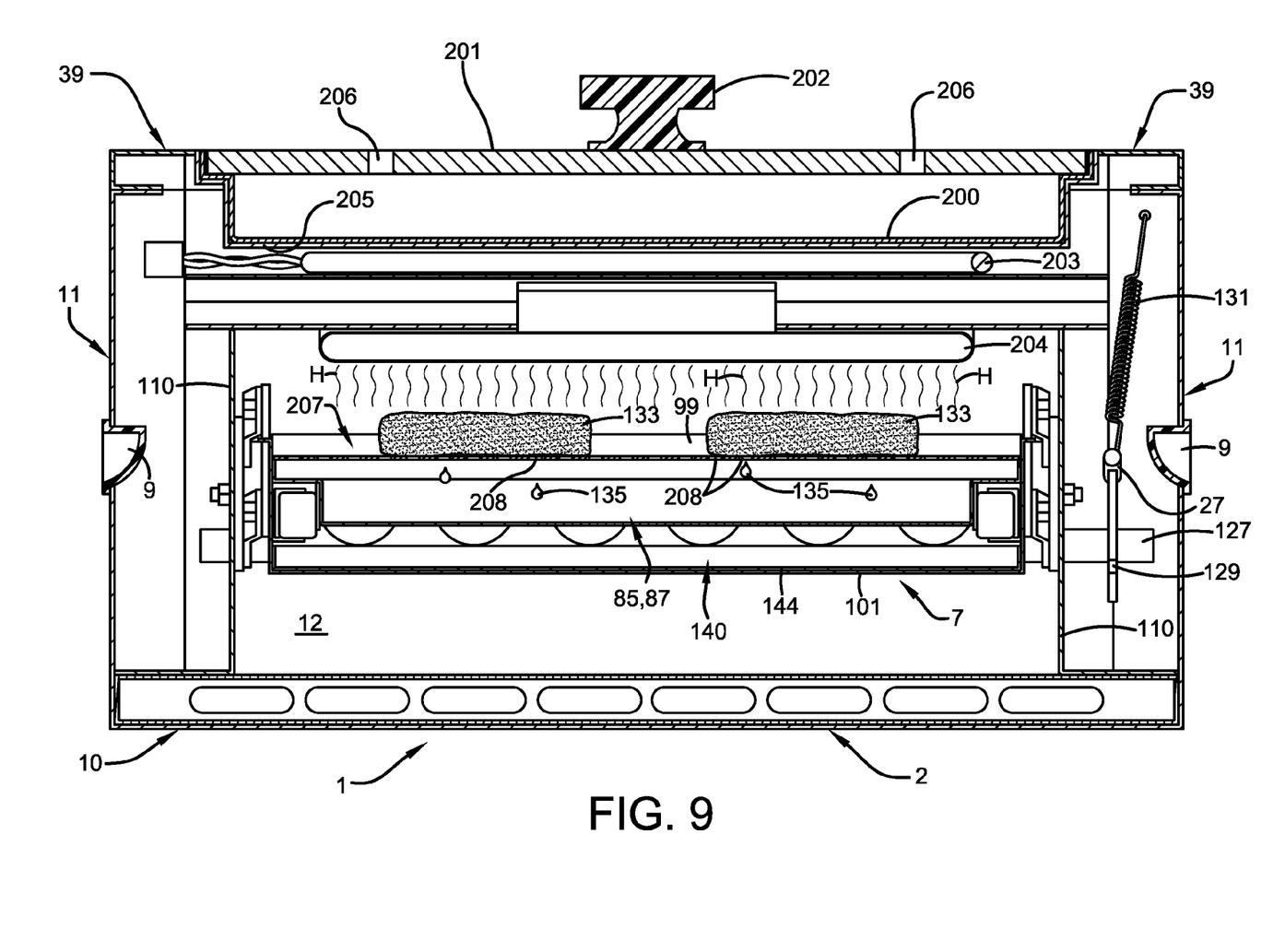
FIG. 9 is a view similar to FIG. 5 taken on line 5-5 of FIG. 1 showing the drawer receiving assembly moving upwardly.

As shown in FIGS. 2-5, drawer receiving assembly 7 may be vertically adjusted, which in turn adjusts the vertical positioning of drawer assembly 5. To that end, each side plate 97 receives a bracket 103 secured thereto having a first end 105 and a spaced apart second end 107. A similar pair of brackets 109 are secured to a corresponding pair of brace walls 110 disposed in cooking chamber 3 (FIG. 9). Each bracket 109 includes a first end 111 and a spaced apart second end 113. An upper arm 115 extends between each pair of brackets 103 and 109.

Specifically, for each upper arm 115, a first end 117 is rotatably secured to first end 105 of bracket 103, while a second end 119 is rotatably secured to first end 111 of bracket 109. Similarly, a lower arm 121 extends between each pair of brackets 103 and 109. However, while a first end 123 of lower arm 121 is rotatably secured to second end 107 of bracket 103, a second end 125 of lower arm 121 is not secured to second end 113 of bracket 109. Second end 125 of lower arm 121 is instead secured to a pivot rod 127 by way of a weld or other peripheral secure connection such that lower arm 121 rotates with pivot rod 127 as pivot rod 127 rotates. Pivot rod 127 extends through second end 113 of bracket 109 and through each brace wall 110 and rotates therein. As shown in FIG. 2, rod 27 is secured to a plate 129 which is in turn secured to pivot rod 127. A spring 131 is secured at one end to plate 129 and secured at the other end to back wall 12 by one of a series of openings defined therein. Spring 131 provides an upward bias on plate 129 and in turn on pivot rod 127. Further, by way of upper arms 115 and lower arm 121, spring 131 provides an upward bias on the entire drawer receiving assembly 7.

As shown in FIGS. 3 and 9, electrical infrared broiler 1 also includes a second drip pan 140. Drip pan 140 includes a front wall 142, a bottom wall 144, and a surrounding wall 146 defining the interior cavity used to contain drippings. Drip pan 140 is manually removable by way of a user simply pulling on drip pan 140 to extend it outwardly away from housing 2 for cleaning, repair, etc. Drip pan 140 is convenient for catching and containing any drippings or splatter which is expelled from the cooking items while the user has drawer assembly 5 in the opening position (FIG. 6). The primary drip pan 87 necessarily moves with drawer assembly 5 as it is manually pulled out of cooking chamber 3. Thus, drip pan 140 remains to catch any material or grease which may be expelled into cooking chamber 3.

As shown in FIGS. 1 and 3, electrical infrared broiler 1 includes electric griddle 205. Electric griddle 205 is a flat elongated surface sized for receiving food, pans, bowls or other items thereupon. At the outset, one familiar with the art will readily understand space is typically limited in the environment for which electrical infrared broiler 1 is intended. A tailgating environment, camping environment, or other such outdoor activities, also typically require multiple types of food to be cooked at once in a short amount of time. As such, electric griddle 205 is heated by stainless steel heating tube 203 positioned within cooking chamber 3 of electrical infrared broiler 1.

As shown in FIG. 4, electrical infrared broiler 1 in general, and front wall 19 in particular, defines opening 40 as a passageway into cooking chamber 3. Opening 40 is oriented such that opening 40 is proximate front area 35. This orientation of opening 40 allows a user to operate electrical infrared broiler 1 by standing directly in front of opening 40. This further blocks children or other users and prevents potential harm done via the heat of electrical infrared broiler 1 from this side. A user may position electrical broiler 1 such that only the back portion is accessible by others. This eliminates the possibility of a child or unfocused adult from being burned by electrical infrared broiler 1.

In operation, a user transports electrical infrared broiler 1 to a desired location such as a sporting event or a camp ground via an automobile or other similar transportation mechanism. The user then plugs in the electrical infrared broiler 1 into a power receptacle via a power cord. The user pushes or depresses push button 21 which turns on the electrical coils within the infrared heating plate 204 and allows current to flow through the coils, which causes the coils to heat the infrared heating plate 204 which in turn heats the food on the grate 207. The user can then push or depress push button 209 of the electrical infrared broiler 1 which allows current to flow through the stainless steel heating tube 203, which causes the tube 203 to heat the electric griddle 205.

For some background, infrared heating of food items works by heating an electrical element to super heat an infrared heating plate, causing it to emit infrared radiation by which the food is cooked. The thermal radiation is generated when heat from the movement of charged particles within atoms is converted to the electromagnetic radiation in the infrared heat frequency range. The benefits are that the heat is uniformly distributed across the cooking surface and that temperatures reach over 900° Fahrenheit, allowing users to sear items quickly. Infrared cooking differs from other forms of grilling, which use hot air to cook the food. Instead of heating the air, infrared radiation heats the food directly. The benefits of this are a reduction in preheat time and less drying of the food. Grilling enthusiasts claim that food cooked on an infrared system tastes similar to food from chargrills. Enthusiasts also say that food cooked using infrared methods seem juicier. Also, infrared heating has the advantages of instant ignition, better heat control, and a uniform heat source. The infrared heating benefits and methods described above are shown in FIG. 9.

As shown in FIG. 9, heat from the infrared heating plate 204 is initially expelled downwardly towards drawer assembly 5, as shown as heat lines H. Specifically, infrared heating plate 204 is superheated causing it to emit infrared radiation by which the food is cooked. This provides a very high temperature within cooking chamber 3 directed downwardly towards any food disposed on grate 207. Further, temperatures can be greater than 900° Fahrenheit within cooking chamber 3. These features represent an enormous improvement over typical portable grills.

For example, as shown in FIG. 9, several hamburger patties 131 are shown disposed on grate 207. These hamburger patties 133 are receiving a tremendous amount of even and uniformly distributed infrared heat via infrared heating plate 204 disposed directly above. Drip pan 87 is disposed directly below hamburger patties 133 oriented to receive any drippings 135 emitted from hamburger patties 133. Note that drippings 135 are travelling away from infrared heating plate 204 during the natural cooking process. This allows infrared heating plate 204 to remain free of any grease or other debris emitted by the food being cooked. This ensures infrared heating plate 204 remains clean and extends the life of infrared heating plate 204. This orientation of infrared heating plate 204, hamburger patties 133, and drip pan 87 also ensures that no scorching or jumping is generated by drippings 135, as is commonly seen in the prior art.

Figure 8:
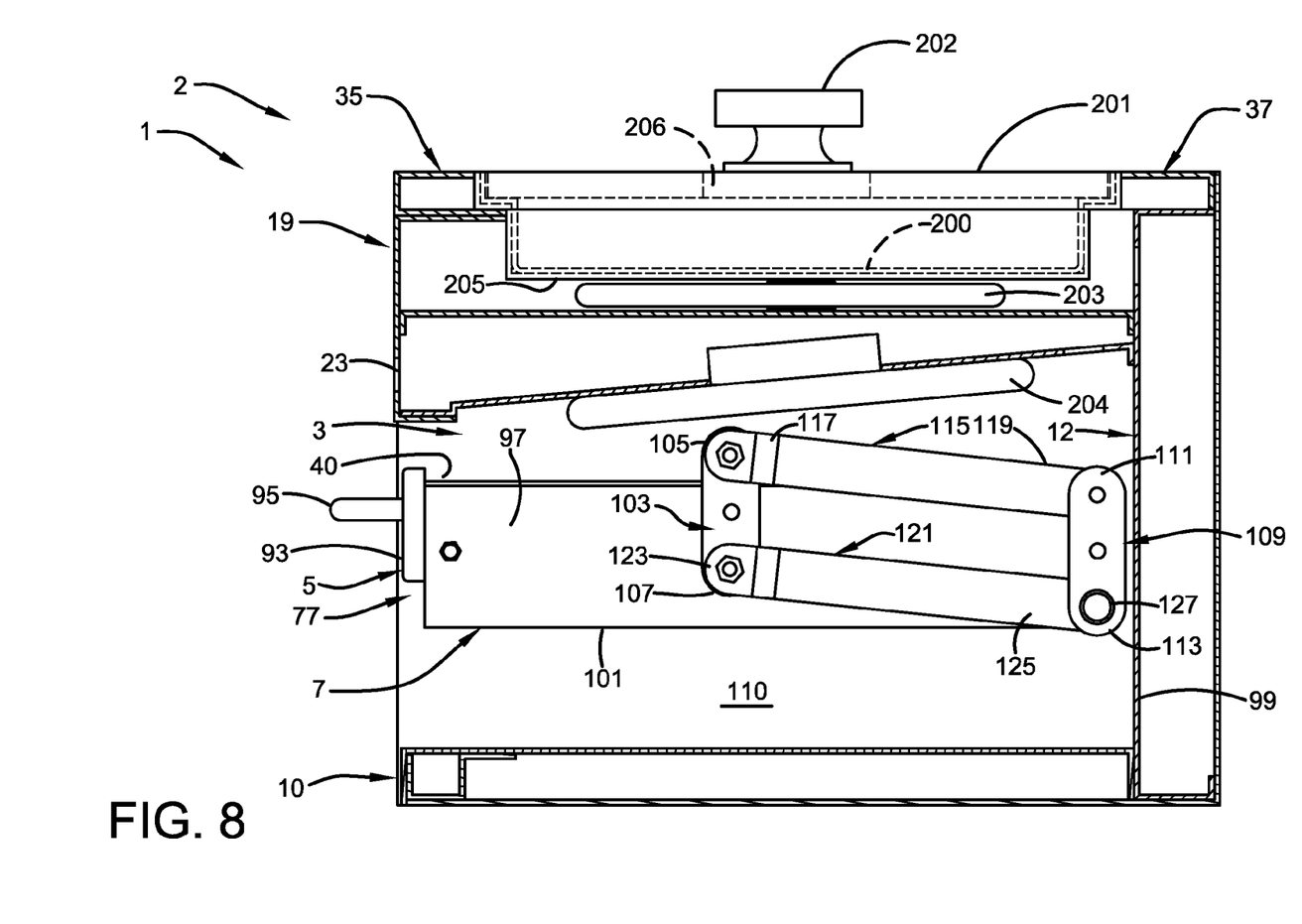
FIG. 8 is a side cross-sectional view taken generally along line 4-4 of FIG. 1 showing the drawer receiving assembly moving upwardly.

As shown in FIGS. 1, 2, 4, and 8, a user may adjust the overall height of drawer assembly 5 and drawer receiving assembly 7 within cooking chamber 3. As shown in FIG. 1, knob 29 extends outwardly away from front wall 19 and is readily accessible by the user. As discussed previously, rod 27 connected to knob 29 is biased upwardly by way of spring 131. This allows the user to manually move knob 29 out of a particular cam channel 131 within track 25 and into another cam channel 31 which reflects a different vertical height within cooking chamber 3. As shown in FIG. 4, drawer receiving assembly 7 is set on the lowest height within cooking chamber 3. As shown in FIG. 8, drawer receiving assembly 7 has been repositioned by the user into the topmost or highest vertical height within cooking chamber 3. While bracket 109 and the associated mechanical linkages thereon remain generally stationary within cooking chamber 3, bracket 103 moves along with drawer receiving assembly 7. To add stability and leverage, upper arm 115 and lower arm 121 mechanically link bracket 109 and bracket 103. As a user manually manipulates rod 27, plate 129 moves pivot rod 127 which in turn moves lower arm 121. Lower arm 121 is connected to bracket 103 generally about the midpoint of side plates 97. This allows movement of drawer receiving assembly 77 vertically upwardly or downwardly while the overall orientation of drawer assembly 5 remains generally horizontal. One would readily understand that any movement of drawer receiving assembly 77 proximate the front or back of side plates 97 would tip or tilt drawer assembly 5 within drawer receiving assembly 7 in a non-horizontal manner. Thus, the present invention allows the user to actuate and move the food disposed on grate 207 vertically within cooking chamber 3 while maintaining a horizontal orientation for the food.

As discussed previously, electrical infrared broiler 1 includes opening 40 disposed in front wall 19, which provides an opening to cooking chamber 3. Opening 40 provides a method for the user to cook and view food without releasing the heat inside cooking chamber 3. As such, cooking chamber 3 is free of a lid and is not exposed to the exterior of broiler 1 except by way of opening 40. Prior art portable grills typically contain an open flame, which requires significant constant fuel to maintain a high temperature. Similarly, other prior art portable grills may contain a lid over the flame. However, when a user opens the lid to check on the food items, all of the heat which has built up inside the grill is thereby released. This swing in temperature from built up heat to released heat prevents a steady heating of the food inside. Conversely, electrical infrared broiler 1 incorporates a new paradigm in portable cooking via opening 40. Opening 40 is oriented such that the heat is constant within cooking chamber 3, is not exposed to the elements, and does not lose heat when a user checks the food. The improved heat control of electrical infrared broiler 1 provides a steady heat source to the food with the benefit of cooking the food more evenly.

In summary, in one aspect, the invention may provide a device similar to electrical portable broiler 1, which may include housing 2, cooking chamber 3 defined by housing 2, a grilling surface which may be in the form of grate 207 disposed in cooking chamber 3, and infrared heating plate 204 disposed above grate 207 to heat food on the grate 207. Portable electrical broiler 1 may also include electric griddle 205 disposed on housing 2. A stainless steel heating tube 203 is then positioned above the infrared heating plate 204, whereby stainless steel heating tube 203 heats electric griddle 205. Portable electrical broiler 1 is adapted to rest on a base surface (not shown) which preferably orients electric griddle 205 generally parallel to the base surface. While any fuel or power source is encompassed by the present invention, preferably broiler 1 is electrical.

In another aspect, the invention may provide a device similar to portable electrical broiler 1, which may include housing 2, electric griddle 205 disposed on housing 2, a grilling surface which may be in the form of grate 207 removably disposed in housing 2, infrared heating plate 204 disposed above grilling surface and operable to heat grilling surface, and stainless steel heating tube 203 disposed above infrared heating plate 204 and operable to heat electric griddle 205. Portable broiler 1 may also include drawer assembly 5 removably disposed in housing 2, drip pan 87 removably disposed in drawer assembly 5, and drip pan 140 removably disposed in housing 2.

In another aspect, the invention may provide a method for cooking an item of food on a grilling surface such as grate 207. The method may include the steps of: positioning stainless steel heating tube 203 above infrared heating plate 204, positioning infrared heating plate 204 above grate 207, positioning electric griddle 205 above stainless steel heating tube 203, directing an amount of heat downwardly from infrared heating plate 204 towards grate 207, and heating electric griddle 205 from below via the stainless steel heating tube 203. The method discussed above may further include the step of biasing grate 207 toward infrared heating plate 204, as shown in FIG. 5 by way of spring 131. Finally, the method may also include the step of transferring electric current through the resistance coil (i.e., stainless steel heating tube 203 and/or infrared heating plate 204) which heats the tube 203 and/or infrared heating plate 204 to a desired temperature and emits heat.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable broiler for use as a combination infrared broiler and electric griddle comprising:
    a housing;
    a cooking chamber defined by the housing;
    a grilling surface disposed in the cooking chamber, the grilling surface comprising a grate disposed with a plurality of punch-through holes; and
    an infrared heating plate comprising an electrical coil embedded in a ceramic plate disposed above the grilling surface, whereby the infrared heating plate heats the grilling surface when powered on; and
    an electrical heating tube disposed in the cooking chamber above the infrared heating plate; and
    an electric griddle disposed on the housing and above the electrical heating tube, whereby the electrical heating tube heats the electric griddle when powered on; and
    a baking pan removably disposed atop the electric griddle; and
    a lid for covering the baking pan.

2. The portable broiler of claim 1, whereby the portable broiler is adapted to rest on a base surface, and whereby the electric griddle is oriented generally parallel to the base surface.

3. The portable broiler of claim 2, wherein the electrical heating tube is a stainless steel heating tube.

4. The portable broiler of claim 3, wherein the electrical heating tube and the infrared heating plate are powered separately.

5. The portable broiler of claim 4, wherein the plurality of punch-through holes are sized to retain food on the grate without allowing the food to slip through the plurality of holes but allowing grease to drip through the plurality of holes.

6. A portable broiler comprising:
    a housing;
    a cooking chamber defined by the housing;
    an electric griddle disposed on the housing;
    a grilling surface removably disposed in the housing, the grilling surface comprising a grate disposed with a plurality of punch-through holes; and
    an infrared heating plate comprising an electrical coil embedded in a ceramic plate disposed in the housing operable to heat the grilling surface, whereby the infrared heating plate is disposed between the electric griddle and the grilling surface; and
    an electrical heating tube disposed in the cooking chamber above the infrared heating plate, whereby the electrical heating tube heats the electric griddle when powered on; and
    an adjustable drawer assembly connected to the housing for containing the grilling surface comprising a plurality of rollers rotatably secured to the drawer assembly for moving the drawer assembly horizontally in and out of the cooking chamber.

7. The portable broiler of claim 6, further comprising a pair of adjustable brackets attached to the housing within the cooking chamber for adjusting the drawer assembly vertically within the cooking chamber, the adjustable brackets each comprising an upper arm, a lower arm, and a linkage bracket pivotally connecting the upper arm, the lower arm and the drawer assembly.

8. The portable broiler of claim 7, wherein the plurality of punch-through holes are sized to retain food on the grate without allowing the food to slip through the plurality of holes but allow grease to drip through the plurality of holes.

9. The portable broiler of claim 8, further comprising:
    a first drip pan removably disposed in the drawer assembly; and
    a second drip pan removably disposed in the housing.

* * * * *